Dec. 6, 1966       E. H. HOOPER       3,290,581
BRIDGE TYPE SINE WAVE GENERATOR
Filed June 28, 1963                    2 Sheets-Sheet 1

WITNESSES:
Bernard R. Gregory
Leon J. Toza

INVENTOR
Edward H. Hooper
BY William L. Gates
ATTORNEY

United States Patent Office 3,290,581
Patented Dec. 6, 1966

3,290,581
BRIDGE TYPE SINE WAVE GENERATOR
Edward H. Hooper, Baltimore, Md., assignor to Westinghouse Electric Corporation, Pittsburgh, Pa., a corporation of Pennsylvania
Filed June 28, 1963, Ser. No. 291,560
8 Claims. (Cl. 321—45)

This invention relates to apparatus for generating high power sine waves from a D.C. power source and more particularly to apparatus for generating high power sine waves in the VLF region of the electromagnetic spectrum.

There is presently known several types of electrical apparatus for the generation of high power sine waves in the VLF and ultrasonic regions of the electromagnetic spectrum where controlled rectifiers are utilized to control the electrical charge on an energy storage element such as a capacitor. The capacitor delivers a predetermined amount of electrical energy to a resonant load, causing it to oscillate at its resonant frequency thereby generating relatively high power sine wave output signals. One such type of apparatus is described and claimed in co-pending U.S. application Serial No. 291,581, now Patent No. 3,243,729, filed June 28, 1963, by Wayne R. Olsen et al. and assigned to the assignee of the present invention. There a capacitor or a plurality of capacitors was individually controlled by a plurality of controlled rectifiers such that during a respective one-half of an operation cycle the capacitor was resonately charged from a D.C. power source and at a predetermined later time the capacitor was discharged during a respective second half cycle of operation into a resonant load, such as a tank circuit, causing it to oscillate. Additionally, a plurality of substantially identical circuit sections each having a storage capacitor was described wherein each section operated sequetnially into the same resonant load. Another type of such apparatus is disclosed and claimed in copending U.S. application Serial No. 291,559, filed June 28, 1963, by Wayne R. Olsen et al. wherein electrical circuitry is described in which electrical energy is delivered to a resonant load to sustain oscillations during both half cycles of operation whereas the first disclosure permitted transfer of energy to the resonant load during only respective half cycles of operation of each circuit section. The second disclosure permitted transfer of energy during both half cycles resulting in not only relatively higher power output but greater efficiency. Again as in the first case, a plurality of substantially identical sections were operated in a predetermined sequence to deliver incremental amounts of power to the resonant load to develop extremely high power output with devices having comparatively lower power handling capabilities. It should be pointed out, however, that the circuitry disclosed in the copending application Serial No. 291,559, suffers from an inherent drawback in that only an odd number of substantially identical circuit sections may be used in a fundamental group. Obviously, the number of substantially identical sections becomes even if an even number of fundamental groups are employed; however, the possible number of sections proceeds in the following order: 3, 5, 6, 7, 9, 10, etc.

It is desirable that there be a means for generating high power sine waves with controlled rectifiers where an even number of circuit sections may be employed in a fundamental group, particularly two and four.

It is an object of the present invention, therefore, to provide improved electrical circuitry for the generation of relatively high power sine waves in the VLF region of the electromagnetic spectrum with semiconductor devices.

It is another object of the present invention to provide a multi-section sine wave generator capable of utilizing an even number of substantially identical sections in a fundamental group.

It is still a further object of the present invention to provide a multi-section sine wave generator capable of operating with fundamental group combinations of two, four and eight substantially identical circuit sections employing controlled rectifier devices.

Briefly, the subject invention comprises electrical circuitry for the generation of high power sine wave generator operating in the VLF and ultrasonic region of the electromagnetic spectrum wherein at least four controlled rectifiers are connected in a bridge circuit combination with an electrical storage capacitor connected across one pair of bridge terminals. The controlled rectifiers are operated in pairs such that opposite circuit arms of the bridge are operated simultaneously and alternately to provide a first and a second current flow direction for the storage capacitor. A D.C. power source and an inductance is coupled across the other pair of bridge terminals so that the charge on the capacitor can be resonantly changed between opposite polarity states by the action of the controlled rectifier pairs. A resonant load is loosely coupled into the circuit so as to be responsive to the charge reversal on the storage capacitor and it oscillates due to the transfer of energy therefrom. This oscillation generates relatively high power sine waves of a predetermined output frequency and the oscillation is sustained by selectively triggering the controlled rectifier pairs at predetermined intervals. The load coupled in the circuit is, for example, of a loaded tank circuit (parallel resonant circuit), a resistively terminated filter, or resonant antenna circuit of a radio transmitter.

Other objects and advantages will become readily apparent from a study of the following specification when read in conjunction with the accompanying drawings, in which.

Figure 1:
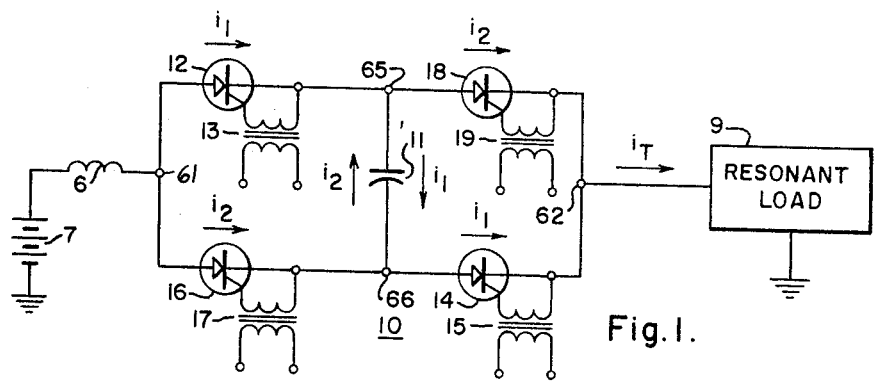
FIGURE 1 is an electrical schematic diagram of a first embodiment of the subject invention and is illustrative of a basic circuit section.

Attention is now directed to FIG. 1 which is illustrative of a basic embodiment of the present invention. There is shown a plurality of controlled rectifiers 12, 14, 16 and 18 coupled together in an electrical bridge circuit combination with each controlled rectifier forming one circuit arm or branch. Associated with the four arms of the bridge are two pairs of bridge terminals 61 and 62, and 65 and 66 which are formed by the connection of the four controlled rectifiers 12, 14, 16 and 18. More specifically the anode electrodes of controlled rectifiers 12 and 16 define terminal 61 while the cathode electrodes of controlled rectifiers 14 and 18 define terminal 62. The cathode electrode of silicon controlled rectifier 12 is commonly connected to the anode electrode of silicon controlled rectifier 18 making terminal 65 and the cathode electrode of silicon controlled rectifier 16 is commonly connected to the anode electrode of silicon controlled rectifier 14 to form terminal 66. Across terminals 65 and 66 is connected an electrical storage capacitor 11, for reasons which will become evident as the description of the operation of the circuit hereinafter proceeds. A D.C. power source 7 is coupled to terminal 61 through an inductance 6 such that the positive terminal is connected to one end of the inductance 6 while the opposite terminal is connected to a point of reference potential referred to hereinafter as group. Coupled to terminal 62 is one side of a resonant load 9 which, for example, may comprise a loaded tank circuit or a relatively terminated filter but nevertheless having a predetermined resonant frequency $f_0$ which will oscillate at that frequency when shock excited by electrical energy. The opposite side of the load is returned to ground providing a return current path for the circuit. Connected to the respective gate electrodes of the controlled rectifiers 12, 14, 16 and 18 are the secondary windings of transformers 13, 15, 17 and 19 respectively. These transformers are for the purposes of activating the controlled rectifiers at desired time intervals by applying proper trigger signals to render them selectively conductive in a manner to be subsequently discussed. The primary windings of the transformers 13, 15, 17 and 19 are adapted to be coupled to a driver source, not shown, which predeterminedly synchronizes or clocks the conduction of the controlled rectifiers 12, 14, 16 and 18.

In operation, controlled rectifiers 12, 14, 16 and 18 are operated in pairs such that controlled rectifiers 12 and 14 are selectively triggered into conduction simultaneously during one half cycle or period of operation and controlled rectifiers 16 and 18 are triggered conductive during another half cycle or period of operation. These two controlled rectifier pairs are operated alternately to change the direction of the charging current for the capacitor 11.

Initially, upon applying a voltage E from power source 7 to the circuit and with the controlled rectifiers 12, 14, 16 and 18 being in their non-conductive states, there is no charge on the capacitor 11. Simultaneously applying trigger signals to the gate electrode of controlled rectifiers 12 and 14 causes them to become conductive and a current $i_1$ flows from the power source 7 through the inductance 6, the controlled rectifiers 12 and 14, the capacitor 11 and the load 9. By selectively choosing the value of the capacitor 11 and the inductance 6 so that an under damped condition exists, the current $i_1$ resonantly charges the capacitor 11 to a voltage $V_c$ which is greater than the source voltage E but less than twice E. The actual value is dependent upon the effective resistance R presented by the load 9 and the square root of the ratio of the inductance L of inductance 6 and capacitance C of capacitor 11. The smaller the value that R assumes the closer the voltage on capacitor 11 approaches 2E. If there were no load or loss in the circuit, the capacitor 11 would charge to exactly 2E. It is essential, however, that the circuit be underdamped, i.e., that R be less than $\sqrt{L/C}$, otherwise an exponentially decaying current will flow and the required in capacitor voltage $V_c$ will not be obtained. As the capacitor 11 becomes fully charged, the current $i_1$ will tend to reverse direction due to the fact that the voltage $V_c$ across capacitor 11 exceeds the supply voltage E. At this instant, controlled rectifiers 12 and 14 will become non-conductive due to their inherent unidirectional current characteristic. A time interval is now required for controlled rectifiers 12 and 14 to recover their forward blocking characteristics.

Controlled rectifiers 16 and 18 are subsequently triggered simultaneously allowing a current $i_2$ to flow in the direction noted. The previous half cycle or conduction period left the capacitor 11 charged with its positive terminal connected to point 65; however, now the polarity of this voltage has been reversed, so that instead of opposing the supply voltage E it adds to the voltage E. The second half cycle proceeds just as the initial half cycle, but with one exception. The net voltage across the circuit is now $E+V_c$, where $V_c$ is equal to E plus some voltage $E_1$ which is between zero and E in magnitude. In other words, at the beginning of the second half cycle, the net voltage is $2E+E_1$. At the end of this half cycle, the capacitor 11 has resonantly charged in the opposite direction such that the positive terminal is now at point 66 and is greater in magnitude than $2E+E_1$, but less than $2(2E+E_1)$.

Figure 2:
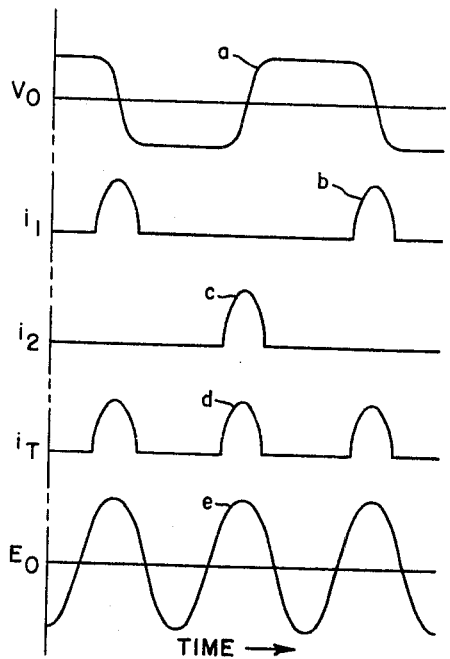
FIG. 2 is a diagram of wave forms helpful in understanding the operation of the embodiment shown in FIG. 1.

It would appear that with each succeeding half cycle, the voltage $V_c$ on the capacitor would build up indefinitely. This does not occur due to the fact that energy is supplied to the circuit at a rate which is proportional to the integral of the currents $i_1$ and $i_2$ while energy is being dissipated in the circuit and the load 9 at a rate proportional to the integral of the square of the currents. Voltage build up can occur only as long as energy is added to the circuit at a faster rate than is dissipated. When the two become equal, an equilibrium state exists and the circuit settles down in a steady state condition which is characterized by a symmetrical voltage on the capacitor (FIG. 2, curve a).

The load 9, being a tuned circuit, will resonate at its natural frequency $f_0$ and will produce a sinusoidal voltage $E_0$ across it, having a peak voltage denoted by $V_0$. The voltage $V_c$ at the end of each half cycle, when the respective controlled rectifier pairs become non-conductive are:

$$V_{c(1)} = 2E - V_{c(2)} - \frac{\pi}{2}V_0$$

and $$V_{c(2)} = -(2E + V_{c(1)} - \frac{\pi}{2}V_0)$$

When equilibrium exists, the magnitude of $V_{c(1)}$ equals the magnitude of $V_{c(2)}$ whereupon solving for $V_0$ yields, $$V_0 = \frac{4}{\pi}E$$

Further, the sinusoidal load voltage $E_0$ imposes restrictions on the circuit to insure that forward voltage will not be re-applied to the just turned off controlled rectifiers within a half cycle or so. To insure that this condition be met $V_c$ must be equal to or greater in magnitude than the sum of the source voltage E and the peak of the sine wave $V_0$, or $$V_c = E + V_0$$
$$= \left(1 + \frac{4}{\pi}\right)E$$
$$= 2.27E$$

which states that the capacitor 11 charges to substantially 2.27 times the supply voltage E each half cycle.

It might be thought that the circuit disclosed in FIG. 1 has a disadvantage in that it necessarily employs a minimum of four controlled rectifiers in each section whereas the copending applications previously noted disclose circuits which operate with only two silicon controlled rectifiers in each section. It should be pointed out, however, that the circuit illustrated in FIG. 1 is capable of operating with relatively higher voltages and lower currents than the circuits disclosed in the copending applications for the same power output. In many practical circuits, there is much to be gained in efficiency by operating at higher voltages and lower currents for a given power output, namely the $I^2R$ losses are reduced. When this is true, more than one controlled rectifier must be connected in series in each position for higher voltage blocking capability whatever the desired circuit might be. Normally in such cases lower current controlled rectifiers would be used. In any event, the concept disclosed herein does nothing more than divide the number of silicon controlled rectifiers in a series string in half and place each half in the arm or circuit branch of a bridge circuit.

FIG. 2 illustrates wave forms exhibited by the embodiment shown in FIG. 1. Curve $a$ of FIG. 2 is a curve illustrative of the voltage wave form that appears across the capacitor 11. It should be pointed out that the wave shape moves above and below the base line by an equal amount at a regular time interval. Curve $b$ is illustrative of the current flow $i_1$ through controlled rectifiers 12 and 14 during a first half cycle of operation wherein capacitor 11 is resonantly charged in a first direction. It will be observed that the wave form of the current $i_1$ is substantially a half sine wave and occurs as the voltage on the capacitor changes from being fully charged in a first or positive direction indicated by being above the base line to an opposite direction by reversing its charge to the opposite sense and being below the base line. The current flow $i_1$ does not go below the base line because as the current tends to reverse the controlled rectifiers 12 and 14 become non-conductive. Curve $c$ is a diagram illustrative of the current flow through in the circuit when controlled rectifiers 16 and 18 are conductive. It should be observed that the current $i_2$ represented by curve $c$ is evenly spaced with respect to time between the two current pulses $i_1$ of curve $b$. Curve $d$ is illustrative of the current through the load 9 and comprises the summation of the currents $i_1$ and $i_2$. Curve $e$ is a wave form representative of the output voltage $E_0$ appearing across the load 9 due to the oscillation caused by the current pulses $i_1$ and $i_2$ flowing therein due to the charge reversal occurring across the capacitor 11. It should be observed that the current pulses of curves $b$ and $c$ are in phase with the voltage $E_0$ generated by the load circuit in such a manner that the load is "shocked" at the correct time to overcome the internal losses and thereby continue to oscillate.

Figure 3:
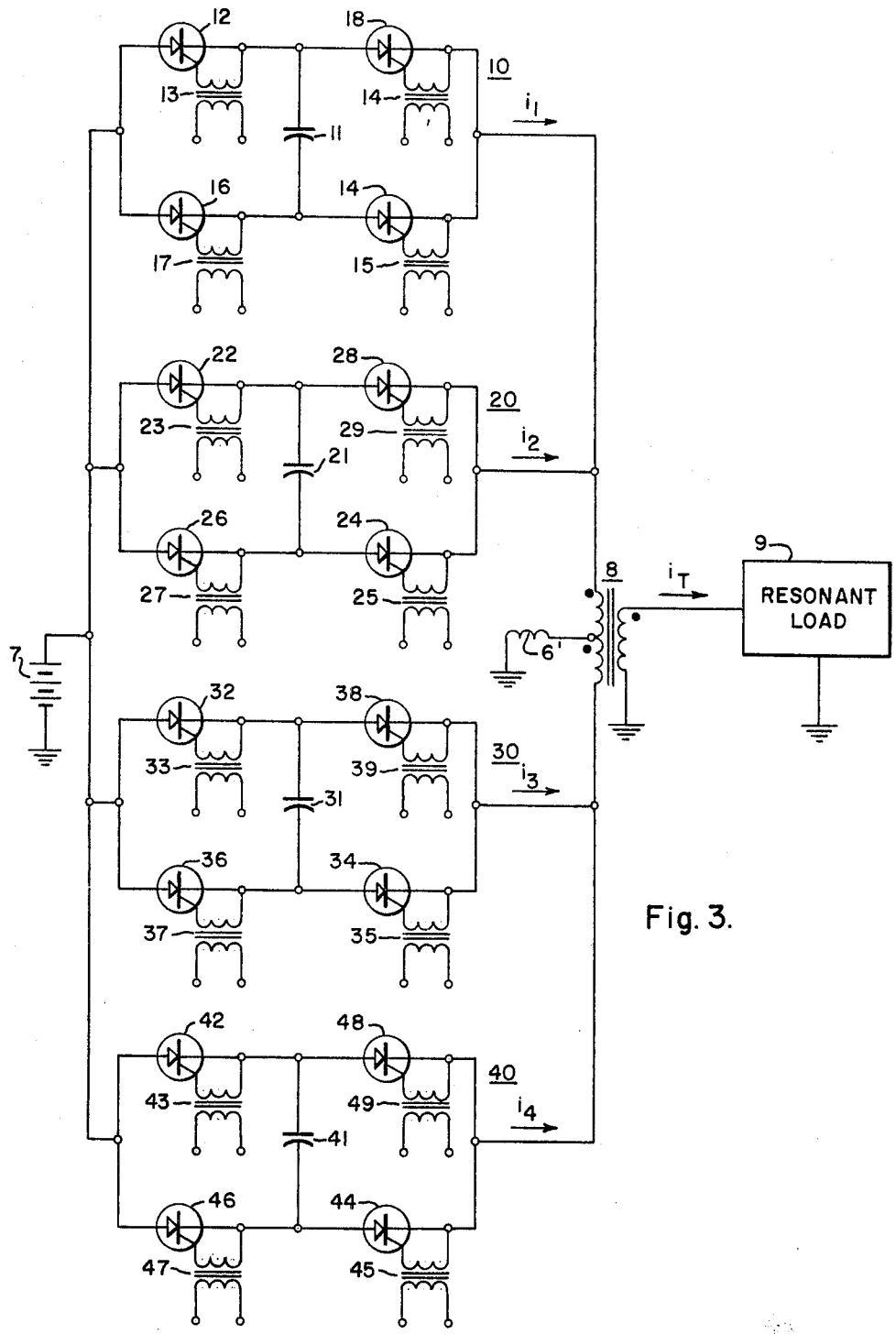
FIG. 3 is a schematic diagram of a multi-section bridge type sine wave generator illustrating a practical embodiment of substantially similar sections illustrated in FIG. 1.

FIG. 3 is a schematic diagram of an embodiment of the present invention wherein the basic circuit illustrated in FIG. 1 is utilized to provide a multi-section sine wave power generator comprising four identical sections 10, 20, 30 and 40 each comprising four controlled rectifiers connected in bridge circuit relationship with a storage capacitor connected across one pair of bridge terminals similar to the circuit shown in FIG. 1. Since the four sections 10, 20, 30 and 40 are substantially identical, a detailed description of section 10 will suffice for all. Similar to the first embodiment, section 10 is comprised of four silicon controlled rectifiers 12, 14, 16 and 18, with corresponding transformers 13, 15, 17 and 19, connected to form a bridge circuit. A storage capacitor 11 is connected between the common connection of the cathode electrode of controlled rectifier 10 and the anode electrode of controlled rectifier 18, and the cathode electrode of controlled rectifier 16 and the anode electrode of controlled rectifier 14. The two remaining terminals of the bridge are respectively connected to a source of D.C. power 7 and to the primary winding of a power output transformer 8.

The four substantially identical sections 10, 20, 30 and 40 are coupled in parallel between the D.C. power source 7 and the primary winding of the output transformer 8. More particularly, sections 10 and 20 are connected in parallel between the D.C. power source 7 and one end of the primary winding of the output transformer 8 while sections 30 and 40 are connected in parallel between D.C. supply source 7 and the other end of the primary winding of the output transformer 8. The primary winding is center-tapped and connected thereto is an inductance 6 which is returned to ground. The secondary winding of the output transformer 8 has one end of winding returned to ground while the opposite end is connected in series to the resonant load 9 which also has one terminal returned to ground to complete a secondary current path therethrough.

The operation of each individual section is identical to that described with respect to the embodiment shown in FIG. 1 in that the capacitors 11, 21, 31 and 41 are adapted to be resonantly charged in opposite directions by the alternate operation of respective pairs of controlled rectifiers in combination with inductance 6 and substantially one half of the primary winding of the output transformer 8.

As has been said before, the controlled rectifiers of each substantially identical section 10, 20, 30 and 40 are operated in pairs to be alternately conductive to resonantly charge each respective storage capacitor in opposite directions. By means of interlaced operation of the four substantially identical sections 10, 20, 30 and 40 in a predetermined time sequence a relatively high power output signal is generated by the load 9. Further by selectively driving sections 10, 20, 30 and 40 in a proper sequence a balanced operation occurs wherein the current flow from each section $i_1$, $i_2$, $i_3$ and $i_4$ is phased to aid the oscillations built up across the resonant load 9. Each section is operated, for example such that section 40 operates first, then section 10, followed by sections 30 and 20 in that order. It can be seen that the four currents $i_1$, $i_2$, $i_3$ and $i_4$ are all unidirectional currents flowing in the same polarity sense out of each bridge into the primary winding of the output transformer 8. The effect of the center tap being returned to ground through the inductance 6' results in currents flowing in the secondary winding of the output transformer 8 that are bipolar, i.e., the currents $i_1$ and $i_2$ will induce currents in the secondary winding of output transformer 8 to be of the same instantaneous direction, whereas the currents $i_3$ and $i_4$ will cause currents in the secondary winding of output transformer 8 to be of opposite instantaneous direction with respect to the primary.

Figure 4:
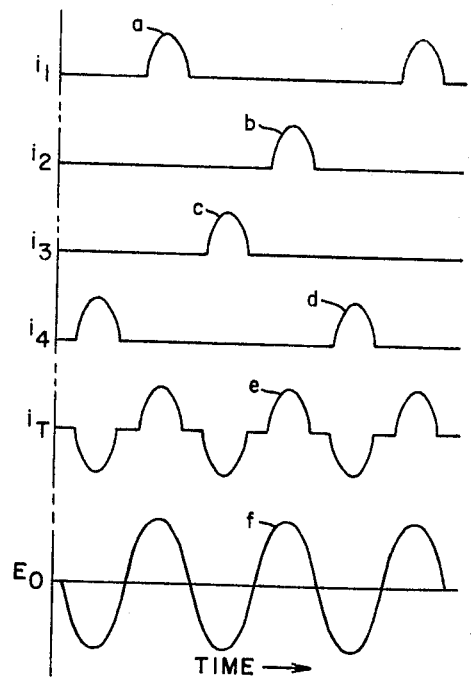
FIG. 4 is a diagram of wave forms helpful in understanding the operation of the multi-section sine wave generator shown in FIG. 3.

Reference to FIG. 4 will illustrate this operation. Curve $a$ is illustrative of the current $i_1$ which is substantially sinusoidal in shape due to the resonance charging of the capacitor 11. Curve $b$ is a wave form of the current $i_2$ from the section 20 and is indicative of the resonance charging of capacitor 21. Curve $c$ is a current wave form of the current $i_3$ flowing in section 30 and is likewise indicative of resonant charging of capacitor 31. Finally, the current in section 40 is indicated by wave form curve $d$ and illustrates the resonant charging of capacitor 41. Curve $e$ is a wave form of the current $i_T$ flowing in the secondary winding of the output transformer 8 and indicates that bipolar currents flow therein due to the respective polarity connections of the output transformer 8. Curve $f$ of FIG. 4 is a wave form representative of the output signal $E_0$ generated in the resonant load circuit 9 and illustrates a sinusoidal voltage wave form of a predetermined frequency $f_0$. It will be appreciated that the current $i_T$ as represented by the curve $e$ is in proper phase relationship with the output signal $E_0$ to aid the oscillations and thereby sustain the output signal due to the proper sequencing of currents $i_1$, $i_2$, $i_3$ and $i_4$.

The controlled rectifiers in the various sections 10, 20, 30 and 40 having been triggered in a predetermined sequence, as indicated in FIG. 4, which allows sufficient time for the previously conducting pair of controlled rectifiers in any particular section to completely recover their forward current characteristics before the second pair in the same section is triggered. When $n$ identical sections operate in sequence to continuously drive a tank circuit and each supplies energy thereto on both half cycles, each section operates at a frequency of $2/n$ times the output frequency, that is, the frequency of operation in any section is less than the output frequency further allowing sufficient transition time for each section.

This then illustrates how an even number of substantially identical circuit sections (4) are combined to provide the necessary energy transfer for desired operation. Previously, (referring to copending application 291,559 since the current in a section reversed on alternate half cycles, an odd number of sections were necessary so that any section would be in the proper state to pick up operation when required. In the present embodiment as shown in FIG. 3, the total current drawn from the D.C. power source 7 comprises $(i_1+i_2+i_3+i_4)$ is nearly continuous. This provides an improvement, from the power supply viewpoint, in that it cannot be equaled with the previously disclosed circuitry without using more sections and hardware than is necessary for a given output power.

What has been described, therefore, is a multisection sine wave generator capable of providing substantially high power sine waves in the VLF and ultrasonic regions of the electromagnetic spectrum where an even number of substantially identical circuit sections can be employed in a fundamental group as opposed to prior disclosed apparatus which was inherently restricted to an odd number of identical circuit sections in a fundamental group.

Although the present invention has been described with a certain degree of particularity, it should be understood that the present disclosure has been made only by way of example and that numerous changes in the detail of the circuitry may be resorted to without departing from the scope and spirit of the present invention.

What I claim is:

1. A sine wave generator powered from a D.C. source comprising in combination: a plurality of switching devices coupled together to form an electrical bridge circuit having a first and a second pair of terminals and adapted to operate such that opposite arms thereof selectively conduct electrical current simultaneously; electrical energy storage means connected across said first pair of terminals; a resonant load including means for being coupled between said D.C. source and said second pair of terminals; and means coupled to said second pair of terminals to resonantly charge said storage means as said bridge circuit alternately changes the direction of current flow through said storage means to deliver electrical energy to said resonant load to sustain electrical oscillations at a predetermined resonant frequency.

2. A sine wave generator comprising in combination: an inductance-capacitance circuit combination adapted to be resonantly charged and discharged from a D.C. source; at least four semiconductor switches arranged in a bridge circuit, being selectively operable in pairs and coupled to the capacitance circuit combination to alternately reverse the electrical charge on the capacitance of said inductance-capacitance circuit combination at predetermined intervals; and a tuned load circuit coupled to said inductance-capacitance circuit combination, being energized by the charge reversal of said capacitance to sustain oscillations at a predetermined output frequency.

3. A sine wave generator comprising in combination an underdamped inductance-capacitor circuit combination adapted to be resonantly charged and discharged from a D.C. source; at least four control rectifiers arranged in a bridge circuit, being selectively operable in pairs and coupled to the capacitor of said inductance-capacitor circuit combination to alternately reverse the charge of said capacitor at predetermined intervals; and a tuned load circuit coupled to said inductance-capacitor circuit combination, being energized by the charge reversal of the capacitor to sustain oscillations at a predetermined output frequency.

4. A sine wave generator comprising in combination at least four semiconductor switches connected in an electrical bridge circuit combination and having a first and a second pair of terminals; a storage capacitance connected across said first pair of terminals; an inductance operably connected to said second pair of terminals for resonantly charging said storage capacitor at predetermined intervals; a source of direct current voltage being selectively connected to said storage capacitor through said at least four semiconductor switches; and a tuned load circuit coupled to said second pair of terminals, to produce sine wave oscillations of a predetermined output frequency.

5. A sine wave carrier generator for a VLF transmitter comprising: a plurality of controlled rectifiers connected in a bridge circuit having four circuit branches and two pair of terminals, said four branches being adapted to be operated so that opposite branches are selectively conducting simultaneously to form a first and a second current path through said bridge circuit; an electrical storage capacitor coupled between one of said two pair of terminals; circuit means for applying a D.C. power source across the other of said two pair of terminals; an inductance coupled to said other pair of terminals for resonantly charging said storage capacitor in two directions as said opposite branches of said bridge circuit alternately cause current to pass through said first and said second current path; a resonant load having a predetermined resonant frequency coupled to said other pair of terminals for sensing the charging of said storage capacitance for absorbing energy therefrom to produce sustained sinusoidal oscillations at said predetermined resonant frequency of said load.

6. A sine wave carrier generator for a VLF transmitter comprising, in combination: a set of controlled rectifiers coupled in a bridge circuit combination having four circuit arms and two pair of terminals, said bridge circuit combination being adapted to be operable so that opposite arms thereof are simultaneously conducting alternately; an electrical capacitance coupled to the first of said two pair of terminals; a source of D.C. power including means for coupling to the second of said two pair of terminals for supplying power to said bridge circuit; circuit means coupled between said source and said second pair of terminals for resonantly reversing the charge on said capacitor as said opposite arms of said bridge are alternately changing the direction of current flow through said capacitor; and a resonant load circuit coupled to said second pair of terminals and being in series circuit relationship with said capacitor to receive energy therefrom as the charge reversal takes place to sustain oscillations at said predetermined frequency.

7. A multi-section sine wave power generator comprising in combination: a plurality of substantially identical electrical circuit sections each comprising a plurality of controlled rectifiers coupled together in a bridge circuit including four circuit arms and two pair of terminals; a storage capacitor coupled across one pair of said two pair of terminals of each bridge circuit; a D.C. power source adapted to be coupled to the other pair of said two pair of terminals of each of said sections; circuit means for selectively operating opposite arms of each of said bridge circuits alternately in a predetermined sequence; electrical circuit means for resonantly reversing the charge on each said capacitor as respective oppoite arm of said bridge circuit conduct current therethrough in oppoite direction; and a resonant load having a predetermined resonant frequency coupled to said plurality of substantially identical sections, being responsive to each charge reversal of said each capacitor to generate and sustain oscillations at a predetermined output frequency.

8. A sine wave carrier generator for a VLF transmitter comprising in combination: a plurality of substantially identical circuit sections, each including a storage capacitor and a plurality of silicon controlled rectifiers arranged in a bridge circuit having two pair of terminals with said capacitor connected across one pair of said two pair of terminals; a source of direct current voltage coupled to the other pair of said two pair of terminals; an inductance coupled to said other pair of terminals of each of said bridge circuit to resonantly charge and discharge said capacitor of said plurality of circuit sections;

circuit means for rendering opposite arms of each bridge circuit of said circuit sections selectively conductive in a predetermined sequence for resonantly charging and discharging each capacitor in opposite directions; and resonant load means including means for coupling to each capacitor, being responsive to the resonant charging and discharging of each capacitor to generate sine waves of a predetermined output frequency.

No references cited.

JOHN F. COUCH, *Primary Examiner.*

M. WACHTELL, *Assistant Examiner.*